UNITED STATES PATENT OFFICE.

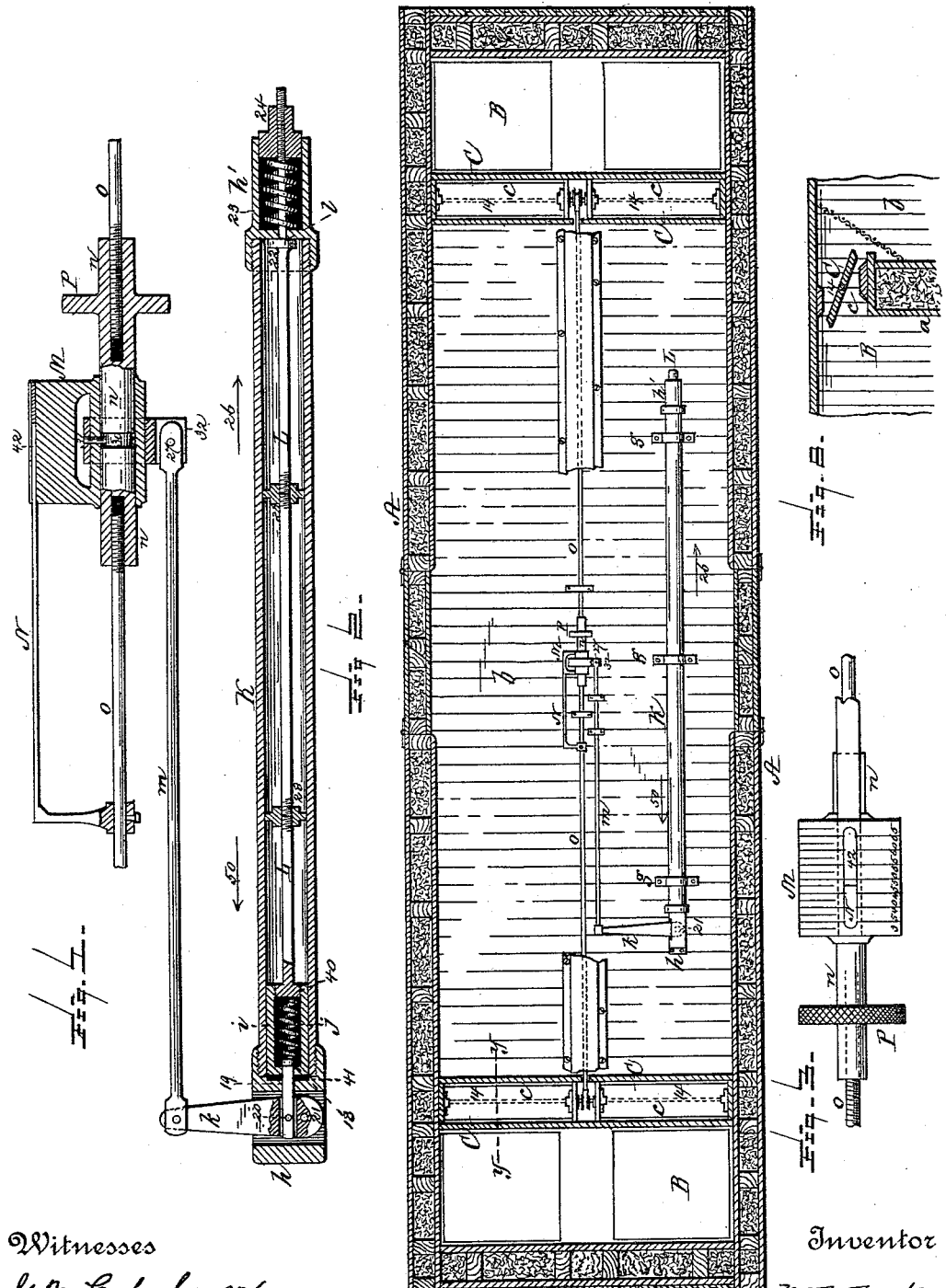

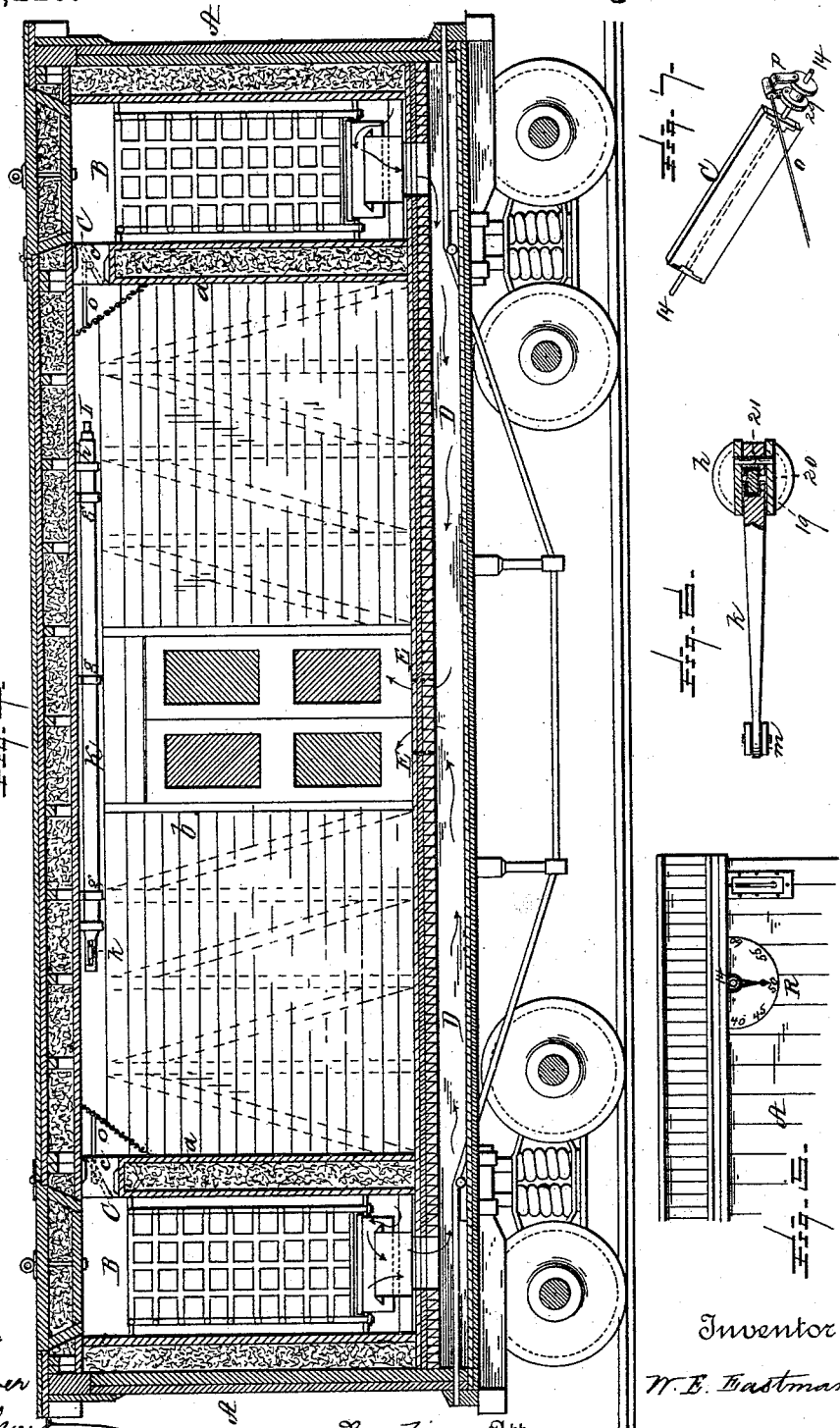

WILLIAM E. EASTMAN, OF BOSTON, MASSACHUSETTS.

AUTOMATIC VALVE-OPERATING MECHANISM AND THERMOSTATIC INDEX AND CONTROLLING DEVICE THEREFOR.

SPECIFICATION forming part of Letters Patent No. 458,226, dated August 25, 1891.

Application filed March 2, 1891. Serial No. 383,462. (No model.)

*To all whom it may concern:*

Be it known that I, WILLIAM E. EASTMAN, of Boston, in the county of Suffolk and State of Massachusetts, have invented an Automatic Valve-Operating Mechanism and a Thermostatic Index and Controlling Device Therefor, of which the following is a full, clear, and exact description, reference being had to the accompanying drawings, making part of this specification, in which—

Figure 1 represents a horizontal longitudinal section through the center of my automatic valve-operating mechanism and my thermostatic index for maintaining a predetermined degree of temperature and for governing the excess of expansion and contraction arising from temperatures above and below the predetermined degree desired and at which the index or pointer has been previously set. Fig. 2 is a plan inverted of the interior of a refrigerating-car, representing my automatic valve-operating and index-controlling mechanism applied to the ceiling of the freight-compartment. Fig. 3 represents a front elevation of a dial and index and an end elevation of the adjustable wheel of the mechanism which controls the length of the valve-rods and the excess of the expansive and contractile movement of the unequal-expansion pair. Fig. 4 is a vertical longitudinal section taken near the center of the refrigerator-car, showing in side elevation my automatic valve-operating and expansion-controlling mechanism. Fig. 5 represents a dial and its index or pointer located on the outside of the car and connected on the inside with a valve-shaft, and also showing a thermometer located on the inside and seen through a window; Fig. 6 detail, representing the vibrating lever of the unequal-expansion pair and its connections. Fig. 7 represents one of the valves for controlling the air-currents and the connection of its shaft with its valve-rod. Fig. 8 is an enlarged transverse section on the line *y y* of Fig. 2, representing one of the air-spaces leading between the freight and ice compartments and the valve for controlling the same.

The two essential features embodied in my present invention are, first, an automatic valve-operating mechanism consisting of and dependent for its action upon an unequal-expansion pair or combination of different metals or liquids, or of both, connected with a valve or damper for regulating the flow of air, water, or other liquid or fluid currents in their general application to the various mechanic arts, the second feature of this invention being a governing or controlling and indicating mechanism for maintaining a predetermined temperature and a means for providing for any excess of expansive and contractile movement of the unequal pair arising from an increase of temperature above or decrease below the predetermined temperature which it is necessary to maintain and which is indicated by a pointer on a dial in order to effect the desired end—*i. e.*, to adjust the connections so as to give only the exact length of or maximum stroke (forward and back) to the valve-rods to open and close the apertures which they control when the index is set to the desired temperature to be maintained, whether for the passage of hot or cold air, gas, steam, water, or other liquid or fluid, the valve-operating parts and their connections being thereby relieved from strain or injury which would occur did not a controlling and compensating provision exist.

While I do not limit my automatic valve-operating mechanism and its governing device in their adaptation to any particular work, I find it desirable herein to describe their functions when so constructed and arranged as to control and measure the air-currents circulating between the freight and refrigerating compartments of a railway refrigerator-car of my invention, a particular description of the construction of such car being found in application, Serial No. 369,097, filed by me October 23, 1890.

Referring to Figs. 2, 4, and 5, the refrigerator-car A, to which my valve-operating mechanism has been applied, is provided with two ice-compartments B B—one at each end of the car—and an interposed freight-compartment *b* for containing the fruit, &c., to be transported. *a* is a thick insulated partition located at each end of the freight-compartment and separating it from the contiguous ice-compartment. These partitions do not extend up to the ceiling of the car, whereby a transverse opening is left, which is divided into two air-passages *c c* at each end of the freight-compartment, communicating with an ice-compartment, said passages being controlled by valves C C, which are free to swing on a common shaft 14, the ends and middle portions of which rest within anti-corrosive bearings secured to the opposite sides of the car and the insulated partition *a*. The top, sides, and floor of the freight-compartment are also insulated, and under its floor are two cold-air passages or flues D, leading from air-passages under each ice-compartment, Fig. 4, to registers E, placed in an opening cut in the insulated floor—four flues D in all, two on each side of the middle sill or sills of the car bottom.

Surrounding the ice-rack in each ice-compartment is an air-space, which, together with its open top, affords access for the air to come into contact with the ice, and which, becoming rapidly cooled, descends, owing to its weight, through the passages under each ice-compartment into the flues D, and thence up through the registers E E into the freight-compartment, whereby when the valves C C are open a continuous circulation of the air-currents is insured between the freight and ice compartments. In order to control these air-currents, so as to maintain within the freight-compartment the desired degree of temperature, being that best adapted to preserve its contents for a considerable time in a perfectly fresh, sweet, and marketable condition, it is necessary that the air-valves should act promptly and reliably at the right time under slight changes of temperature, and as the desired result is not practical by the manipulation of an attendant I have invented the following-described automatic expansion and contraction mechanism, which, with its associated governing device, renders it a matter easy to accomplish.

K is a tube of brass, (fourteen feet long, two and seven-eighths inches in diameter, and one-fourth inch thick,) which is hung loosely within clips *g*, secured to the ceiling of the freight-compartment, one end of said tube screwing into a plate *h*, also secured to the ceiling, the other end of the tube having a short tubular extension *h'* screwed thereover, by which construction the tube is free to expand and lengthen in the direction of the arrow 26 and contract or shorten in an opposite direction when under the influence of variations of temperature within the freight-compartment. Within the stationary end of the brass tube is fitted a hollow cylinder *i*, free to slide therein and having a spiral spring *j* located within it, one end of the spring bearing against the head 18 of a pin or follower 19, which projects through an opening in the cylinder *i* and having secured thereto at 20 a lever *k*, which is pivoted to a pin 21, passing loosely through it. Inside of this brass tube K is a cast-iron rod L, passing through bearings 28, of same outer diameter as the interior of the tube and free to slide therein, the brass of the tube K being much more sensitive to changes of temperature than the iron of the rod L. A shoulder 22 on this rod L rests on a seat *l* of the tubular extension *h'* and is held thereon by the expansive force of a spiral spring 23, the outer end of the rod L being threaded and passing through the tubular extension and having a regulating-nut 24 screwed thereon, the spring 23 surrounding that portion of said rod located in the extension *h'* and the nut being free to slide therein in common with the rod. The opposite end of this rod is enlarged and screws into the inner end of the hollow cylinder *i* and forms a seat 40 for the inner end of the spiral spring *j*, a space 41 between the end of the cylinder and plate *h* being left when the temperature is at the mean or desired degree for the movement of the cylinder when the tube and rod contract.

From the foregoing it will be readily understood that an increase of temperature will cause the brass tube to expand, and consequently lengthen in the direction of the arrow 26—*i. e.*, from left to right—Fig. 1, it being impossible to lengthen in the opposite direction, owing to its fixed connection with the stationary plate *h*, and while lengthening the distance between the seat *l* of the extension *h'* and the pivot 21 of the lever *k* will increase and the spring *j* in the hollow cylinder *i* will assert itself and cause the cylinder to slide within the tube K from left to right and oblige the shoulder 22 to follow the receding seat *l* and press it thereon, the spring 23 also exerting its influence to draw it on said seat, the expansive capacity of the iron of the rod L being but very slight, assisting but little in this operation.

As the head of the pin 19 is confined within the cylinder *i* and the pin is secured to the lever *k* (as before described) at 20, it follows that when the cylinder moves from left to right the lever will also be vibrated in the same direction. Again, when the brass tube is contracting by a decrease of temperature below the point at which it and the rod L has been adjusted the distance between the seat *l* and the pivot 21 of the lever will be reduced and the cylinder *i* will be carried from right to left (see arrow 50) and close the space 41 which existed between it and the plate *h* at the desired mean temperature, the result of which is that the spring *j* will press the pin 19 from right to left (the plate being cut away to allow of this movement) and the lever *k* will be vibrated in the same direction, and it is evident from the foregoing construction that if this automatic device be connected with the air-valves C C by suitable intermediate mechanism they will be operated thereby, thus opening and closing the air-passages *c c* at the tops of the partitions *a a* between the freight and ice compartments.

The adjustment of the regulating-nut 24 to set the spring 23 to the required tension, the adjustment of the spring $j$, and the length of the rod L in relation to the length of the tube K and amount of vibration to be given the lever $k$, &c., are matters which require much care and experience, in order that the valve-rods $o$ $o$ will only perform their full stroke or movement in either direction, forward or back, sufficient to insure the maximum opening or closing of the air-passages $c$ $c$ by the valves C C and so that the entire strain exerted thereafter by a continued expansion or contraction of the unequal expansion pair will be intercepted by the springs and the mechanism and its connections relieved from injury. I will now describe a mechanism interposed between said valves and my automatic device for operating them, the object of this interposed mechanism being to control the expansion pair and adjust the lengths of the connections so accurately that it will regulate and give the exact movements to the valve-rods when the temperature inside the freight-compartment has arrived at the predetermined degree desired, the aforesaid springs providing for any additional movement arising from any excess or further expansion or contraction, whereby a uniform or nearly uniform degree of temperature is maintained within the freight-compartment. To the free or outer end of the lever $k$ is secured one end of a rod $m$, Figs. 1, 2, and 6, the other end of the rod being secured at 27 to a projection 32 on the outside of a dial-plate M, having numerals represented thereon, and through a cylindrical aperture in said dial-plate passes a cylindrical brass block or connection $n$, having an opening in each end, provided with a screw-thread, into which is turned the inner threaded end of a rod $o$, the outer end of which is secured by a bifurcated device $p$ to a pair of disks 29, attached to the center of the shaft 14 of the pair of valves C C. (See Fig. 7.) This bifurcated device $p$ is connected with the disks 29 at or near their peripheries, so as to insure the necessary rotation of the shaft to operate the valves C C. The central portion of the cylindrical connection $n$ is provided on its outside with an annular groove 30, into which fits a pin 31, which passes through the dial-plate M, and while preventing its movement lengthwise independently thereof permits it to revolve in common therewith.

N is an index or pointer adjustably connected at one end with one of the rods $o$ (the left-hand one shown in Fig. 1) and sliding at its opposite end in a dovetail groove 42 in the dial-plate M. The cylindrical connection $n$, which unites the two rods $o$, is provided with a milled hand-wheel $p$, which on being turned (through the connections already described) will cause the connection $n$ and dial to be moved simultaneously therewith on the rods $o$, this dial traveling to the left or right, according to the direction in which the hand-wheel is turned, and consequently the lever $k$ will be vibrated to the left or right and the rods $o$ connected with the valves will be adjusted in length and actuated in the same direction to close the air-passages $c$ $c$ at any previously-determined temperature indicated by the pointer opposite the figures representing the degree desired. If a high degree of temperature—say 60°—is desired to be retained within the freight-compartment, the lever $k$ is vibrated to the right by turning the milled wheel $p$ toward the operator, (i. e., revolving the top toward him,) the index or pointer moving opposite the figures indicating 60° on the dial. If a low degree of temperature—say 40°—is desired, the wheel (i. e., its top) is turned from the operator and the free end of the lever $k$ is vibrated to the left, while the pointer will move over the dial opposite the figures 40.

Suppose the temperature desired to be maintained within the freight-compartment is fifty degrees, (50°.) When the air therein has arrived at this temperature, (which may be ascertained by a thermometer,) the wheel P is turned till the pointer (moving over the dial) stands opposite the figures "50" thereon, when the lengths of the valve-rods and connecting mechanism will have been carefully adjusted, so as to be capable of actuating the valves sufficiently to exactly close the air-passages $c$ $c$, simultaneous with which the expansion of the unequal expansion pair or combination is just adequate to give the necessary vibration to the lever $k$ to insure precisely this required movement (and no more) of the valve-rods, and after the said passages are closed should an increase of temperature occur, resulting in a still further or excess of expansion, an increased pressure will be exerted on the rods to open the passages, after which a still further increase of pressure, resulting from an additional increase of temperature, will be received by the yielding springs $j$ and 23—that is to say, a pressure greater than that produced by the expansion necessary to exactly close the passages $c$ $c$—whereby the springs are made to yield and relieve the connecting mechanism from unnecessary strain and injury. On the rise of the temperature above 50° inside the freight-compartment from lack of ice or for want of sufficient air circulation the air-valves will open the passages and increase the circulating currents until the temperature in the freight-compartment has again fallen to the desired predetermined temperature (50°) indicated by the pointer on the dial, after which the air-valves will again close the air-passages $c$ $c$. Should the contraction continue by a still further reduction of temperature than that sufficient to give the maximum movement to the closing of the valves the end of the pin 19 will come into contact with the side of the plate $h$ and the spring $j$ will commence to yield.

The springs $j$ and 23 perform the office of safety-valves to relieve the parts and their connections from strain and injury after the rods have properly actuated the air-valves C C.

The temperature inside the freight-compartment may be ascertained by a thermometer $r$ inside and seen through a window, Fig. 5, and in the event of the automatic mechanism being temporarily out of order or disconnected from the air-valves C the latter may be manipulated and operated to a limited extent by means of a pointer secured directly to the end of each valve-shaft and moved over the face of an outside dial R.

By the employment of a delicately-adjusted automatic mechanism, set and controlled by a sensitive governing device in accordance with my invention, I am readily enabled to obtain and preserve a high degree of temperature in the freight-compartment when so desired, which I believe has not been effected in the previous history of the art of refrigeration, for the reason that the cold-air currents were always in full force, because no means were provided for their regulation to and from the ice. Therefore it will be seen that when by my automatic and controlling mechanism I can promptly diminish the air circulation where a high temperature is to be maintained the supply of ice is more slowly consumed, the result of which is to effect a saving of ice proportionate to the degree of temperature maintained, amounting, perhaps, to a saving of from fifty to sixty per cent. of the ice when a temperature of 60° is maintained inside, with an outside temperature of 80° or 90°. When the temperature inside rises above the degree at which the index is set, the valves will open in proportion to the excess of the heat and rapidity of its increase and the temperature will fall as promptly to the degree at which the index is set.

My herein-described invention consists of an automatic valve-operating mechanism and index setting or controlling device for adjusting the effective length and movement of the parts for any desired degree of temperature previously determined on, and the means for providing for any excess of expansion or contraction beyond a certain mean required for the forward and back stroke or movement of the valve-rods may without any or but little change of construction be located in various positions and perform different kinds of work—for instance, for opening and closing dampers of car-ventilators and car-heaters, furnaces, stoves, &c., steam, gas, and water engines.

I claim—

1. An unequal expansion pair or combination, a means for controlling the excess of contraction and expansion of the same, a valve C, valve-rod $o$, and valve-passage $c$, in combination with an adjustable index mechanism consisting, essentially, of a connection $n$, wheel P, dial M, and index N for determining the length of the valve-rod at any pre-determined degree of temperature, constructed and arranged substantially as described, whereby the circulation of the air-currents will be increased by an increase of temperature when above that shown by the index and be decreased by the reduction of temperature when below the predetermined degree and the desired temperature be uniformly maintained, as specified.

2. An automatic valve-operating mechanism consisting, essentially, of a tube K and rod L, springs $j$ 23 at the opposite ends of the rod, and a lever $k$, vibrated in one direction by the differential expansion of said tube and rod and in the opposite direction by the differential contraction of the pair, in combination with a valve C, a valve-passage $c$, and an interposed connecting mechanism for maintaining a predetermined temperature and controlling the excess of expansion, as set forth.

3. An automatic valve-operating mechanism consisting of a tube K and rod L of differential expansion capacities, a tubular extension $h'$ and hollow cylinder $i$ at their ends, springs $j$ 23, regulating-nut 24 and pin 19, lever $k$, and plate $h$, in combination with an index mechanism for regulating the action of the automatic mechanism and for maintaining a predetermined degree of temperature, substantially as described.

4. An index-regulating mechanism having as its essential features a dial M, an index or pointer N, and an adjustable wheel P, in combination with and interposed between the valve-rods $o$ and an unequal expansion pair for operating the valves, substantially as and for the purpose set forth.

5. A dial M, pointer N, adjustable wheel P, and connection $n$, in combination with the valve-rods $o$, connecting-rod $m$, and lever $k$, vibrated by the expansion and contraction of an unequal expansion pair, as specified.

6. The connection $n$, with its groove 30 and hollow threaded ends, the dial M, surrounding it, the pin 31, and projection 32, in combination with the rod $m$, the unequal expansion pair, and threaded valve-rods $o$, connected therewith for operating the valves C, substantially as described.

Witness my hand this 26th day of February, 1891.

WILLIAM E. EASTMAN.

In presence of—
 CHARLES ALMY, Jr.,
 LYMAN SPALDING.